United States Patent [19]

Learn, Jr.

[11] Patent Number: 4,720,170

[45] Date of Patent: Jan. 19, 1988

[54] DAYLAMP SYSTEM

[76] Inventor: Martin P. Learn, Jr., 1885 Nautilus St., LaJolla, Calif. 92037

[21] Appl. No.: 729,173

[22] Filed: Apr. 30, 1985

[51] Int. Cl.$^4$ ............................................. G02B 17/00
[52] U.S. Cl. ................................................. 350/264
[58] Field of Search ............................. 350/258–265, 350/96.1; 126/417, 425; 353/3; 250/203 R

[56] References Cited

U.S. PATENT DOCUMENTS

| | | | |
|---|---|---|---|
| 1,254,520 | 1/1918 | MacDuff | 350/264 |
| 4,246,477 | 1/1981 | Latter | 350/262 X |
| 4,349,245 | 9/1982 | Kliman | 350/264 |
| 4,354,484 | 10/1982 | Malone et al. | 126/425 |
| 4,394,860 | 7/1983 | Smith | 350/258 X |
| 4,425,905 | 1/1984 | Mori | 126/425 |

Primary Examiner—Richard A. Wintercorn
Attorney, Agent, or Firm—John B. Dickman, III

[57] ABSTRACT

A central lighting system for commercial buildings employing core daylighting with tracking heliostats, light beam processing, heat extraction and utilization, distribution through light pipes, fiberoptics, prisms, and mirrors. The system incorporates a central artificial light source, also with heat extraction and utilization for domestic hot water, air conditioning, or refrigeration as desired. The system includes microprocessor control and monitoring of all functions, light amplification through high frequency beam splitting, and light storage, in the form of super-insulated extreme heat.

12 Claims, 3 Drawing Figures

DAYLAMP SYSTEM

BACKGROUND OF THE INVENTION

Rising cost in fuels and the potential danger of nuclear reactors have increased the efforts to find an alternative source of energy. One direction being explored is solar energy which can be used to provide illumination and heat. In many states, direct sunlight is available between 2000 and 2500 hours per year. Optimal utilization of available solar energy to commercial buildings can save over 50% of energy costs during daylight hours.

The Solar Energy Research Institute and the Lawrence Berkeley Laboratory, Windows Research Division have been conducting research on the use of solar energy for illuminating the interiors of commercial buildings. One such system under investigation uses a tracking heliostat to reflect light onto a skylight. Another concentrates direct sunlight onto a tubular mirror system for distribution of illumination throughout the building. By combining these two, solar energy becomes competitive.

There are several patents on the subject of solar energy as a source of daylighting in interior of a building. Two such patents are U.S. Pat. Nos. 3,033,144, Nicolson and 4,349,245, Kliman. The Nicolson patent employs a lens system on a rotating tracking system for following the sun and a light conduit with prisoms and lenses for directing daylight in a building. In the Kliman patent, the sun's rays are collected by a heliostat and directed to a dielectric mirror where visible light is reflected through a distribution system to various points of illumination in a a building.

The use of solar energy is also disclosed in the following U.S. patents: U.S. Pat. No. 4,211,212, U.S. Pat. No. 4,282,858, and U.S. Pat. No. 4,335,578.

SUMMARY OF THE INVENTION

The present invention relates to a daylighting system using solar energy to illuminate the interior of buildings. In particular, an efficient an inexpensive device for tracking the sun, concentrating a large amount of sunlight into a stationary parallel beam, an integrated chamber for heat extraction, and a distribution system employing tubular mirrors, fiberoptics, prisms, and light pipes or guides. The secondary and tertiary mirrors will be cooled providing additional heat for domestic hot water, air conditioning, or refrigeration. And the concentration and distribution systems will be laser aligned.

By adding high intensity artificial light sources to the distribution system, and a microprocessor to control and coordinate all the functions we have a central lighting system that uses freely available daylight whenever possible and an enhanced efficiency artificial light source at others. Such a system offers commercial property managers numerous opportunities for savings.

The primary objective of the invention is to provide commercial buildings with a source of illumination which is not only cheaper than conventional electric lighting but offers a higher quality of illumination. Central lighting systems will enjoy efficiencies comparable to central heating and air conditioning versus numerous small distributed units.

A secondary feature of this system will offer domestic hot water, or heated freon vapor for air conditioning or refrigeration with no energy cost. The integrated circulating water heat filter offers safety advantages as well as the utilization of solar heat as a byproduct.

Another object is to produce a system for tracking the sun, concentrating it's energy, processing it, and distributing the energy using commercially available parts and materials in a novel way. Further, it will demonstrate that this may be accomplished in a very cost effective manner, and will be relatively simple for general contractors to adapt to thousands of existing commercial buildings.

A still further object is to provide an economical means for concentrating sunlight into intense beams that may themselves be processed for various optical uses, or conjoined with others for industrial processes such as welding, smelting, casting, toxic waste destruction, and incineration.

These and other objects will be understood from the following description.

DESCRIPTION OF THE INVENTION

Figure 1:
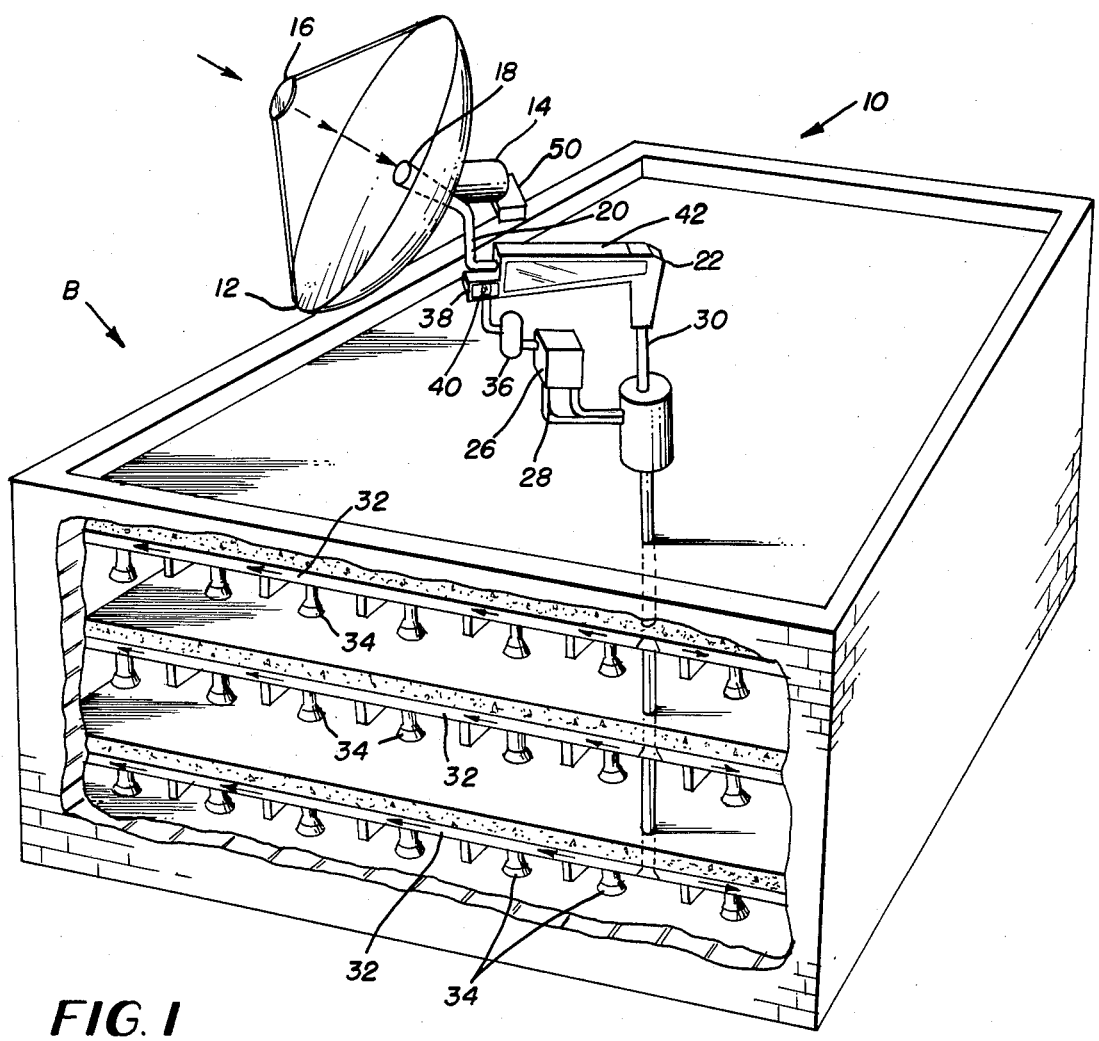
FIG. 1 is a perspective view of a solar daylighting system of this invention.
Figure 2:
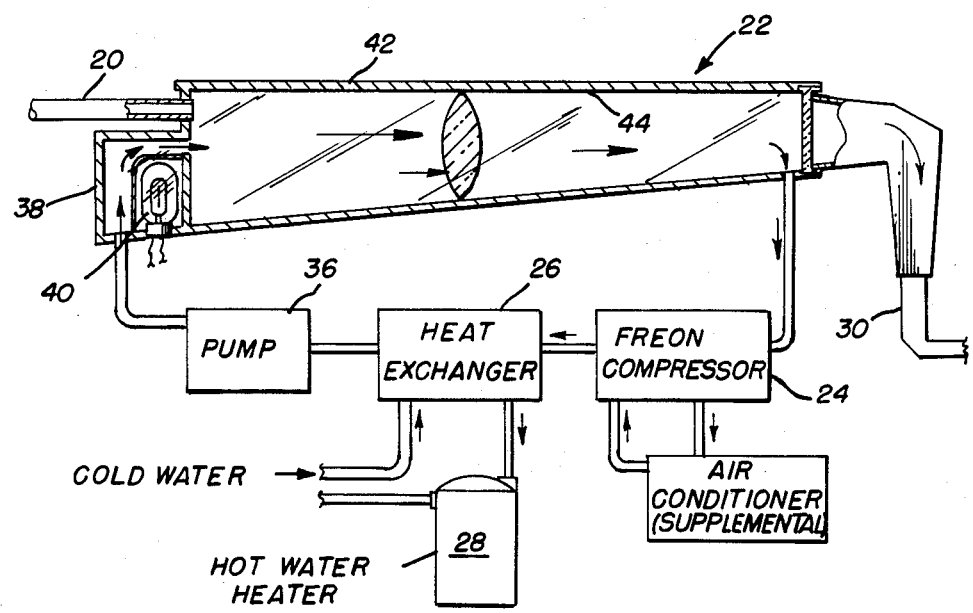
FIG. 2 is a side plan view of a heat filter or separator of this invention.
Figure 3:
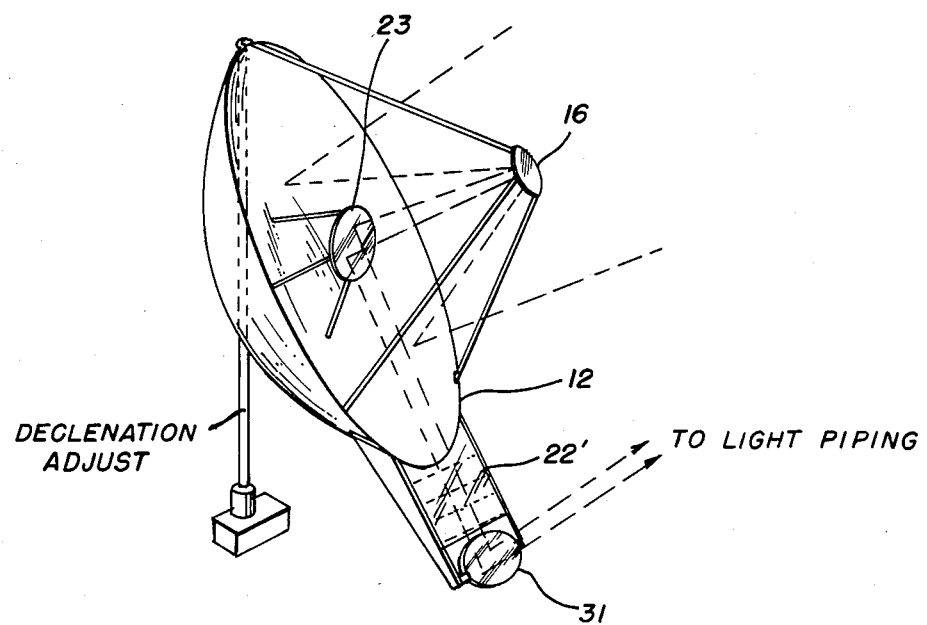
FIG. 3 is another embodiment of a solar daylighting system of the invention, including swivel-pivot mounting tee, processing mirror, light amplifier, light storage device, and sectional view of cooled mirrors.

Referring to the drawing, and in particular FIGS. 1 and 2, there is shown a solar daylighting system 10 on the roof of a multistory building B. The daylighting system uses a heliostat 12 with a reflective parabolic dish with a secondary parabolic or hyperbolic subreflector 16 mounted near the focal point of the primary mirror. Commercially available satellite dishes may be converted to such a heliostat by lining them with a metallized film of UV stabliized polycarbonate or acrylic. A thin layer of silver with an anti-oxidant coating is the preferred reflective material.

The subreflectors will be cooled by piping water or freon through pipes in the mirrors backing. Solid metallic blocks containing cooling tubes may be cast in the appropriate shape and mirrored by plating, polishing, or laminating other reflective materials to the cast mirror body. The supporting members attaching the subreflectors to the primary reflector will be insulated and used to channel the cooling fluids to and from the subreflectors and through the cooling tubes. The secondary subreflector will also serve as a counterweight to the dish while tracking.

Sunlight is reflected by the parabolic dish to the subreflector where it is focused and directed to a light funnel 18, which also serves as a safety shield to prevent burns by bystanders or the building. Connected to the light funnel 18 is a light channel 20, a flexible reflective tube which conducts the concentrated light to a heat separator 22, and from there to the light piping system within the building. The heat separator 22 may also be placed between the light funnel 18 and the light channel 20, with the light conducted through the light channel 20 to the light piping system.

The heat separation unit 22 consists of an insulated circuit of piped water from a working pump 36, which may be photovoltaic powered, through a jacket 38 surrounding an auxiliary, high-intensity, artificial light source 40, through a transparent chamber 42, to a heat exchanger 26, and finally returning to the pump again. The circulating working fluid extracts heat from the central artificial light source 40, when in use, before passing through the transparent chamber 42, in which ultra-violet and infra-red radiation is absorbed by the working fluid, and transferred to the heat exchanger 26 where this absorbed heat is imparted into a heating coil where domestic hot water is heated or freon or other coolant is vaporized. A separate circuit carries the DHW or freon vapor up the supporting pipes of the sub-reflectors to cool them while heating the DHW of freon vapor further.

The heat separation chamber 42, has ends made of transparent glass such as crown glass, or plastic which is transparent to infra-red radiation on the entry end, and optical glass transparent to visible light but reflective or absorptive to infra-red on the exit end. The chamber wall 44 shall be reflective to the highest degree possible, with care being take to avoid any bubbles within the system. Sensors will be monitoring the temperatures of the heat separation chamber, heat exchanger, sub-reflectors, and the working fluid, to keep it from boiling.

The working fluid will contain a biocide such as mercury or iodine, which will not be degraded by sunlight, and a dye to facilitate UV absorption. Colorimetrically, the fluid will transmit greater than 98% of the visible light presented to it over the one meter length of the chamber. The entry and exit ports for the fluid are respectively at the same ends as for the light beam, being sized and positioned to minimize light loss down these tubes.

A second pump controlled by a microprocessor 50 may be added to assume water flow through the heat separator 22 in the event of one pump failure. Filters and lenses may be added to the chamber 42 to modify the quality and quantity of light emitted from the chamber.

The auxiliary light source 40 may be of a variety and a mixture of types. High and low pressure sodium may be used for decorative purposes alone, or combined with mercury vapor, halogen, or quartz lamps as well as mixed gas lamps to provide a central source of illumination that is pleasing to the eye. As newer and higher efficiency light sources are developed these will contribute to savings in the buildings in any climate, weather condition, or time of day.

When the central artificial light source being kept outside the building, the usual heat of illumination is kept outside of the building improving workers comfort, reducing air conditioning requirements, and permitting installation of smaller HVAC systems in new construction. In fact, this heat will be utilized for DHW, air conditioning or refrigeration.

In the return line from the heat separation unit 22 to the pump 36 are a Freon compressor 24 connected to an air conditioner, and/or a heat exchanger 26 connected to a hot water heater 28. Working fluid is also circuited to cool subreflectors before vaporizing freon or heating DHW.

At the end of the heat separation unit 22 away from the auxillary light source 40 are a plurality of light pipes or fiber optics capable of conducting a very large flux of light for long distance to the light outlets and diffusers at the various floors of the building. The light pipes may be reflectorized glass pipes, various plastics, or brightened metallic tubes. Where needed, light pipe joints, curves, connectors, tee's, etc., may be formed by butt-ing end to side anastomoses, internal reflectors, or removing the reflective material from the light pipes and joining pipes together at the necessary angle. These are known as optical light conductors.

The transmission of light from the light pipes into the workspaces will be accomplished by a variety of mechanisms. Fiberoptics may couple with light pipes, penetrating the ceiling and either directly shine on a work area, or floor display, or may employ diffusers to soften the glare. By directing these flexible fiberoptics back at the ceiling, or onto walls a very diffuse and flexible lighting pattern may be achieved. Much the same may be accomplished with hollow light pipes, using diffusers, a length of translucent piping, partially mirrored piping, or abutting the pipes into fluorescent fixtures themselves, making use of the pre-existing diffusing panels available, and making no new additions to the ceiling space within the buildings.

The micro-processor 50 controls the attitude of the heliostat 12 by operating the two tracking motors 14. Short pulses of electricity drive the motors, maintaining both azimuth and declination angles to between 6 and 60 arcminutes of the position of the sun. A computer program for tracking the sun also returns the heliostat to the eastward horizon at dawn and goes off tracking if a malfunction is detected. On cloudy days and evenings, the microprocessor would switch on the auxiliary light source 40, or the existing fluorescent lighting as a backup, based on measurements of illumination levels by photosensors inside the building. Other functions performed by the microprocessor include regulation of fluid flows through the heat separation chamber, the sub-reflectors, and even the choice of supplying DHW, air conditioning, or space heating with the heat extracted from daylight. Also, fans, security systems, alarms, etc. are microprocessor controlled.

Heliostat tracking may also be accomplished by passive or active hydraulic devices, or optical devices which respond to the sun's position and either apply mechanical pressure directly to the control arms of the heliostat, or activate small electric tracking motors 14.

A light amplifier 79, a beam splitter, will permit the light beam to be reflected over several times more area by high speed revolution of angled mirrors through the light beam. The beam splitter is mechanically directed into two different directions by mechanism that is revolving so quickly that it appears that 100% of the light is showing at all points. This division should exceed 50 Hz.

DESCRIPTION OF THE SECOND EMBODIMENT

This system is similar to the primary system except the flexible light channel 20 is replaced by adding the heat separation unit 22' directly to the heliostat 12, rotating with it, and adding it's mounting to the structural strength of the heliostat. In addition, a flat tertiary mirror 23 located in the center of the primary dish reflects the beam from the secondary reflector at a right angle toward the rim of the primary reflector along the north south axis about which the heliostat assembly itself rotates. Once through the heat separation chamber the beam is once again reflected at a right angle horizontally along an east west axis forming a stationary intense beam of daylight within the light piping system. This last reflection is made within a heavy swivel-pivot mounting tee 31, which incorporates a highly polished right angle mirror internal to the tee, which translates the rotating beam of varying declination into a constantly stationary east-west beam. At this point, flat processing mirrors can direct the intense beam down utility shafts, or to conjoin with other beams at an elevated industrial site.

When multiple units are used for process heat, the heat separation chambers 22 will be omitted. With computer controlled angulation of the processing mirrors, such a unit may be adapted to military purposes such as anti-personnel (blinding or burning) and remote fire setting during daylight hours. With the heat separation unit removed, all subreflectors and processing mirrors would have to be cooled.

This embodiment requires, at the base, a mount capable of reflecting the beam coming from the tertiary reflector and heat separation chamber into a constantly stationary beam of light entering the light piping system. Since the heliostat rotates while changing angle from the horizontal (declination), this requires a heavy mount in which the large bore light channel coming from the heat separation chamber must be able to rotate within the vertical arm of the tee, while the entire tee and heliostat assembly pivots on the axis of the horizontal arm of the upside-down tee mount. The reflecting mirror is placed at exactly a 45 degree angle from the horizontal and vertical, and is set in a fixed position with the tee. Therefore, it pivots with change in declination but does not swivel with the rotating heliostat assembly.

This mount is bearing about half of the weight of the heliostat assembly, and must be able to withstand thermal shocks, and physical stress brought about by wind loading of the whole assembly.

A collimator, either by lenses, small parabolic mirrors, or graded density fiberoptic bundles can help to maintain the cohesiveness of the daylight beam, as well as perform divisions, and redirections as needed.

While two embodiments of the invention have been disclosed, it is understood that one skilled in the art may after studying the present invention, realize other embodiments. Therefore, for a full understanding, one should consider the invention by studying the drawings and disclosure in view of the allowed claims.

I claim:

1. A daylighting system for providing illumination to the interior of a building using solar energy as a source of light comprising:
  a solar energy collector means mounted on the buildings' roof by means of Coude' and Gregorian types of Cassegrainian optical systems
  a means of moving said collector means to an attitude tracking the sun's position in the sky during daylight hours
  a heat separation means for removing heat from the concentrated beam of sunlight and for applying said heat to other uses; and
  light guide means for channeling and distributing concentrated light beams throughout places of use in the building.

2. A daylighting system as in claim 1 wherein a micro-processor controls the means for moving and aiming said collector, said controls include emergency shutdown, said micro-processor and other means maintaining said collector at an attitude within 6 to 60 arcminutes of the sun.

3. A daylighting system as in claim 1 wherein heat is absorbed from the concentrated light beam by a circulating water filled chamber with transparent crown glass light entry and exit ports, reflective walls, and water entry and exit ports out of the direct beam of light, said water chamber being two meters or less in length, said water containing biocidal agents, as well as additives such as yellowish dyes to facilitate the absorption of Ultraviolet radiation.

4. A daylighting system as in claim 2 wherein said microprocessor also controls functions relating to heat separation from concentrated light beam and transfer of heat from glass and metallic mirrors cooled by piped water, freon, and coolants through the substance of certain of the mirrors.

5. A daylighting system as in claim 2 wherein said microprocessor also controls rates of fluid flow through cooling circuits, heat separation chamber, air conditioning compressor, hot water heat exchanger, chiller, or refrigerator, and permits switching between these functions automatically or manually.

6. A daylighting system as in claim 2 wherein said microprocessor directs electrical switching on of central artificial light source and/or pre-existing conventional lighting system as needed, blending of artificial and natural light sources are regulated to permit maximum utilization of available natural daylight.

7. A daylighting system as set forth in claim 1 in which the solar collector is an existing type parabolic dish covered with a thin reflective film.

8. A daylighting system as set forth in anyone claims 1–6, in which the collector is mounted on a heavy swivel-pivot tee, said mounting tee incorporating therein a highly polished large ninety degree deflecting mirror, thereby permitting the translation of an intense rotating beam of sunlight from different declinations into a stationary constant beam of intense light for processing.

9. A daylighting system as in as in anyone of claims 1–7, wherein the intense beam of sunlight is conducted throughout the building by means of tubular mirrors, fiberoptics, prisms, and mirrors within or without enclosure by tubes to divide, channel, distribute, deflect, reflect, and diffuse the beam for use in interior lighting, photocell sensing and microprocessor control of motorized mirrors and prisms insertable into the concentrated beam. Shutters can block the light beam if darkening a room is desired.

10. A daylighting system as in claim 9, wherein the source of concentrated daylight is combined with a very intense source of artificial light using one or a plurality of artificial light sources, such sources including low pressure sodium, high pressure sodium, mercury vapor, quartz-halogen lamps, carbon arc lamps, mixed gas lamps, or any combination of the above or other electric light sources.

11. A daylighting system as in claim 9 in which said intense beam of light is concentrated on a crucible of metal or other suitable material, said material being enclosed in a heavily insulated container, whereby said metal or other material is heated to a white hot temperature and effectively stores light and heat, said insulated container containing argon or other inert gases to aid insulation and avoid oxygen reactivity.

12. A central lighting system as in claim 10 wherein said intense beam of daylight or artificial light is processed with a large scale splitter or chopper, with angled mirrors in said chopper revolving through the light beam at frequencies exceeding 30 Hz, and preferably over 100 Hz the beam will be effectively amplified, and caused to illuminate two, four, or possibly many target areas, and due to the phenomen of flicker fusion and image latency in the human eye, this may permit the multiplication of areas illuminated by a single light source.

* * * * *